(12) United States Patent
Jain

(10) Patent No.: US 7,761,589 B1
(45) Date of Patent: Jul. 20, 2010

(54) FLOW CONTROL FOR MULTI-HOP NETWORKS

(75) Inventor: Nitin Jain, Saratoga, CA (US)

(73) Assignee: Foundry Networks, Inc., Santa Clara, CA (US)

( * ) Notice: Subject to any disclaimer, the term of this patent is extended or adjusted under 35 U.S.C. 154(b) by 868 days.

(21) Appl. No.: 10/702,387

(22) Filed: Nov. 4, 2003

Related U.S. Application Data

(63) Continuation-in-part of application No. 10/693,037, filed on Oct. 23, 2003, now Pat. No. 7,639,608.

(51) Int. Cl.
*G06F 15/16* (2006.01)
(52) U.S. Cl. .................. 709/232; 709/235; 709/236; 370/229
(58) Field of Classification Search ......... 709/231–236, 709/238; 379/389; 370/229–231
See application file for complete search history.

(56) References Cited

U.S. PATENT DOCUMENTS

| | | | |
|---|---|---|---|
| 4,727,537 A | 2/1988 | Nichols | 370/85 |
| 5,305,321 A | 4/1994 | Crayford | 370/94 |
| 5,355,375 A | 10/1994 | Christensen | 370/85.2 |
| 5,436,617 A | 7/1995 | Adams et al. | 340/825.4 |
| 5,517,520 A | 5/1996 | Chi | 375/212 |
| 5,535,211 A | 7/1996 | Yano | 370/85.2 |
| 5,673,254 A | 9/1997 | Crayford | 370/231 |
| 6,084,879 A | 7/2000 | Berl et al. | 370/389 |
| 6,128,665 A | 10/2000 | Iturralde | |
| 6,147,995 A | 11/2000 | Dobbins et al. | |
| 6,167,029 A | 12/2000 | Ramakrishnan | |
| 6,170,022 B1 * | 1/2001 | Linville et al. | 710/29 |
| 6,181,699 B1 * | 1/2001 | Crinion et al. | 370/392 |
| 6,405,258 B1 | 6/2002 | Erimli et al. | 709/235 |
| 6,539,022 B1 | 3/2003 | Virgile | |

(Continued)

FOREIGN PATENT DOCUMENTS

EP          0529774 A1        3/1993

(Continued)

OTHER PUBLICATIONS

"Baseband system guidelines and concepts, 10 Mb/s", from Annex B, *System Guidelines, IEEE*, Std 802.3-2002, Section One, pp. 489-511.

(Continued)

*Primary Examiner*—Salad Abdullahi
(74) *Attorney, Agent, or Firm*—Nixon Peabody LLP; John P. Schaub

(57) ABSTRACT

Solutions are provided that allow a network device to apply flow control on the MAC layer while taking into account the priority of the frame of traffic. This may be accomplished by generating a frame indicating that traffic flow should be paused, while utilizing a new opcode value, or alternatively by utilizing a new type/length value (possibly combined with a new opcode value). A receiving device may then examine the fields of the frame to determine whether it should it should use priority-based pausing, and then examine other fields to determine which priority-levels to pause and for how long. This allows for improved efficiency in flow control at the MAC layer. Additionally, the tagged pause frames can be forwarded over multiple hops on Local Area Networks across a Metropolitan Area Network or Wide Area Network.

28 Claims, 15 Drawing Sheets

U.S. PATENT DOCUMENTS

| | | | |
|---|---|---|---|
| 6,560,236 B1 | 5/2003 | Marghese et al. | |
| 6,707,817 B1 | 3/2004 | Kadambi et al. | 370/390 |
| 6,850,542 B2 | 2/2005 | Tzeng | |
| 6,957,269 B2 * | 10/2005 | Williams et al. | 709/235 |
| 6,957,270 B1 * | 10/2005 | Erimli et al. | 709/235 |
| 6,981,054 B1 * | 12/2005 | Krishna | 709/235 |
| 7,009,968 B2 | 3/2006 | Ambe et al. | |
| 7,020,139 B2 | 3/2006 | Kalkunte et al. | |
| 7,035,255 B2 | 4/2006 | Tzeng | |
| 7,035,286 B2 | 4/2006 | Tzeng | |
| 7,062,568 B1 | 6/2006 | Senevirathne et al. | |
| 7,065,050 B1 | 6/2006 | Herbst | 370/235 |
| 7,145,869 B1 | 12/2006 | Kadambi et al. | 370/229 |
| 7,161,948 B2 | 1/2007 | Sampath et al. | 370/402 |
| 7,180,857 B2 * | 2/2007 | Kawakami et al. | 370/231 |
| 7,212,534 B2 | 5/2007 | Kadambi et al. | 370/395.2 |
| 7,292,572 B2 | 11/2007 | Liu et al. | |
| 7,423,967 B2 | 9/2008 | Tzeng et al. | |
| 2002/0087723 A1 * | 7/2002 | Williams et al. | 709/240 |
| 2003/0037163 A1 * | 2/2003 | Kitada et al. | 709/236 |
| 2003/0055900 A1 * | 3/2003 | Glas et al. | 709/205 |
| 2003/0120759 A1 * | 6/2003 | Ogawa | 709/221 |
| 2003/0185249 A1 | 10/2003 | Davies et al. | |
| 2004/0032868 A1 * | 2/2004 | Oda et al. | 370/389 |
| 2004/0081090 A1 * | 4/2004 | Hara et al. | 370/229 |
| 2004/0095882 A1 * | 5/2004 | Hamzah et al. | 370/229 |
| 2005/0021846 A1 * | 1/2005 | Tzeng et al. | 709/238 |

FOREIGN PATENT DOCUMENTS

| | | |
|---|---|---|
| EP | 0648034 A1 | 4/1995 |
| EP | 0 948 853 B1 | 8/2004 |

OTHER PUBLICATIONS

"IEEE Std. 802.3-2002, Section One: Annex B—System Guidelines," IEEE 2002, pp. 489-511.
Office Action in U.S. Appl. No. 10/693,037 dated Jan. 25, 2008.
Final Office Action dated Nov. 12, 2008, U.S. Appl. No. 10/693,037.
Non-final Office Action dated Mar. 17, 2009, U.S. Appl. No. 10/693,037.
Notice of Allowance dated Sep. 21, 2009, U.S. Appl. No. 10/693,037.
Notice of Allowance dated Jun. 29, 2009, U.S. Appl. No. 10/693,037.
Virtual Bridged Local Area Networks—Amendment: Priority-based Flow Control, IEEE P802.1Qbb/D2.2, pp. 1-41 (Apr. 15, 2010).
DeSanti, Claudio, IEEE 802.1 Liaison Report to T11, T11/08-335v0, pp. 1-4 (Jun. 2008).
NetApp - Ethernet Storage Guy, http://blogs.netapp.com/ethernet/8021qbb, pp. 1-3 (May 6, 2010).
Smith, Graham et al., "Converged Enhanced Ethernet—Good for iSCSI SANs", NetApp White Paper, Blade Network Technologies, pp. 1-7 (Oct. 2008).
Hagen, Mikkel, "Data Center Bridging Tutorial", University of New Hampshire—InterOperability Laboratory, pp. 1-3.
Brocade Fabric OS v6.12_cee1, Brocade, Release Notes v3.0, pp. 1-15 (Sep. 2, 2009).
iSCSI Primer, Ethernet Alliance SC09, pp. 1-17.
Barrass, Hugh (Cisco) et al., "Proposal for Pirority Based Flow Control", pp. 1-9 (Mar. 27, 2008).
myProject™ - P802.1Qbb PAR Detail, Amendment to IEEE Standard, 2 pgs. (Feb. 13, 2008).
Barrass, Hugh (Cisco) et al., "Proposal for Priority Based Flow Control", pp. 1-9 (Apr. 7, 2008).
Barrass, Hugh (Cisco) et al., "Proposal for Priority Based Flow Control", vol. 2, pp. 1-9 (Apr. 7, 2008).
Barrass, Hugh (Cisco) et al., "Proposal for Priority Based Flow Control", pp. 1-9 (Apr. 21, 2008).
Barrass, Hugh (Cisco) et al., "Proposal for Priority Based Flow Control", pp. 1-9 (May 8, 2008).
Thaler, Pat, "BB Frame Issues", IEEE 802, pthaler@broadcom.com, pp. 1-3 (Jul. 2008).
Pelissier, Joe, "Proposed Relation Between PFC and the MAC Control Sublayer", Cisco, bb-pelissier-pfc-mac-conrol-0708, pp. 1-11.
Pelissier, Joe, "Convergence of 802.1Q, PFC, AVB, and ETS", Cisco, bb-pelissier-convergence-proposal-1108, pp. 1-23.
Pelissier, Joe, "PFC Defense Mode Proposal", Cisco, bb-pelissier-pfc-defense-0409, pp. 1-5.
"PFC and Untagged Frames", Brocade, pp. 1-11 (May 2009).
DeSanti, Claudio, "PFC State Diagrams", vol. 1, pp. 1-12 (Sep. 2009).
DeSanti, Claudio, "PFC State Diagrams", vol. 2, pp. 1-7 (Sep. 2009).
"Data Center Bridging (aka CEE) - It is not just for FCoE", © 2009 Blade Network Technologies, pp. 1-22 (Feb. 25, 2010).
DeSanti, "802.1Qbb Status", Cisco, bb-cds-draft-0-2-status-1108, pp. 1-4.
Lippitt, Mark et al., "Fibre Channel over Ethernet (FCOE)", Version 4.1, EMC Techbooks, pp. 1-404.
IEEE Standard for Information technology—Telecommunications and information exchange between systems—Local and metropolitan area networks—Specific requirements, Part 3: Carrier Sense Multiple Access with Collision Detection (CSMA/CD) Access Method and Physical Layer Specifications, Amendment 2: Ethernet Organizationally Specific Type, Length, Value (TLVs), Amendment to IEEE Std. 802.3 - 2008, CSMA/CD, pp. 1-38 (Copyright 2009).
IEEE Standard for Information technology—Telecommunications and information exchange between systems—Local and metropolitan area networks—Specific requirements, Part 3: Carrier Sense Multiple Access with Collision Detection (CSMA/CD) Access Method and Physical Layer Specifications, IEEE Std. 802.3 - 2008/Cor 1-2009, pp. 1-12 (Feb. 1, 2010).
IEEE Standard for Information technology—Telecommunications and information exchange between systems—Local and metropolitan area networks—Specific requirements, "Part 3: Carrier Sense Multiple Access with Collision Detection (CSMA/CD) access method and Physical Layer specifications", Section Two, Revision of IEEE 802.3, pp. 1-790 (© 2008).

* cited by examiner

| | |
|---|---|
| Destination Address | 6 bytes |
| Source Address | 6 bytes |
| Type/Length | 2 bytes |
| Opcode | 2 bytes |
| Priority Mask | 2 bytes |
| Pause Time | 16 bytes |
| Reserved | 26 bytes |

FIG. 4

| Destination Address | 01-80-c2-00-00-01 |
|---|---|
| Source Address | |
| Type/Length | 8808 |
| Opcode | 3 |
| Priority Mask | 00000111 |
| Pause Time | 00-00-00-00-00-03-05-07 |
| Reserved | |

FIG. 5

| | |
|---|---|
| Destination Address | 6 bytes |
| Source Address | 6 bytes |
| Type/Length | 2 bytes |
| VLAN ID | 2 bytes |
| Type/length | 2 bytes |
| Opcode | 2 bytes |
| Priority mask | 2 bytes |
| Pause Time | 16 bytes |
| Reserved | 26 bytes |

FIG. 7

FLOW CONTROL FOR MULTI-HOP NETWORKS

RELATED APPLICATIONS

This application is a continuation-in-part of U.S. patent application Ser. No. 10/693,037, entitled "Priority Aware MAC Flow Control" by inventors Nitin Jain and Rajkumar Jalan, filed on Oct. 23, 2003 now U.S. Pat. No. 7,639,608.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention relates to the field of switching in a computer network. More particularly, the present invention relates to the tagging of frames indicating that traffic should be paused with a tag identifying a corresponding VLAN to provide flow control in a multi-hop network.

BACKGROUND OF THE INVENTION

A switch is a device that provides a switching function (i.e., determines a physical path) in a data communications network. Switching may often involve transferring information, such as digital data packets or frames, among entities of the network. Switching is accomplished by examining data on one or more of the network layers. One such type of switching is media access control (MAC) address-based switching, which involves switching in the data link layer. The data link layer is also commonly referred to as layer 2 of the OSI Reference Model. Specifically, switching may occur through Ethernet and/or Gigabit Ethernet on full duplex ports for layer 2 networks.

During switching, there is often a need for flow control of packets, in case of network outages or if a network device does not have enough resources to handle the received traffic. In a full duplex network, a receiver can signal to the transmitter to stop sending the traffic if it does not have enough resources to handle the traffic. The IEEE 802.3x Specification (now part of 802.3, Annex 31B), uses PAUSE frames for a device to signal another device. The specialized MAC control PAUSE frames according to IEEE 802.3x are depicted in FIG. 1. Each frame 100 comprises a destination address 102 (6 bytes), a source address 104 (6 bytes), a type/length field 106 (2 bytes), an opcode 108 (2 bytes), a pause time field (2 bytes) 110 and 42 bytes of reserved empty space 112. When a frame is transmitted, it is preceded by a 7 byte preamble and 1 byte Start-Frame-Delimiter, and then followed by a 4 byte frame check sequence.

The PAUSE frame causes any device receiving it to stop forwarding traffic to the requested device for the specified period of time. The hope is that when that period of time is up, the device has resources available for the traffic.

This flow control mechanism, however, does not discriminate among the incoming frames—it applies to all incoming frames to a device. In certain systems, however, frames may be prioritized. For example, voice data may have a high priority level as it is extremely time sensitive, whereas text data may have a low priority level. Furthermore, certain subscriber's traffic may be afforded higher priority than others. The prior art flow control mechanism, however, violates these priorities by simply ceasing all incoming transmissions. This can even defeat the purpose of flow control in the first place, by deteriorating network throughput, causing more transmissions, and a compounding of the problem.

What is needed is a mechanism wherein the MAC can take the action of the flow control and apply it in a way that takes into account the priority of the frames.

Furthermore, currently PAUSE frames are sent out as untagged and only have significance on a single link. FIG. 2 is a diagram illustrating a typical system utilizing PAUSE frames. Here, the device that transmits the PAUSE frame 200 wishes to cause another device 202 to hold off on transmitting frames for a time. The other device 202 processes the PAUSE frame it receives but does nothing further with the frame itself.

However, in the metro Ethernet environment, clients and servers may not be directly connected, but rather connected over several hops. FIG. 3 is a diagram illustrating a typical metro Ethernet environment. The transmitting device 300 in a first VLAN is separated from the receiving device 302, also in the first VLAN, by several hops 304-314, which are typically switches or hubs. Currently, the point-to-point nature of the PAUSE mechanism prevents the receiving device 302 from receiving the PAUSE frame, because the first hop 304 processes the frame without forwarding it. What is needed is a mechanism to extend the PAUSE frame solution to Virtual Local Area Networks (VLANs) across multiple hops. What is also needed is a mechanism that would allow the traffic flow in a specific VLAN to be paused, without pausing traffic flow in other VLANs.

BRIEF DESCRIPTION

Solutions are provided that allow a network device to apply flow control on the MAC layer while taking into account the priority of the frame of traffic. This may be accomplished by generating a frame indicating that traffic flow should be paused, while utilizing a new opcode value, or alternatively by utilizing a new type/length value (possibly combined with a new opcode value). A receiving device may then examine the fields of the frame to determine whether it should it should use priority-based pausing, and then examine other fields to determine which priority-levels to pause and for how long. This allows for improved efficiency in flow control at the MAC layer. Additionally, the tagged pause frames can be forwarded over multiple hops on Local Area Networks across a Metropolitan Area Network or Wide Area Network.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIG. 4 is a diagram illustrating a PAUSE frame format in accordance with an embodiment of the present invention.

FIG. 5 is a diagram illustrating an example PAUSE frame in accordance with an embodiment of the present invention.

FIG. 7 is a diagram illustrating a VLAN tagged priority-based PAUSE frame protocol in accordance with an embodiment of the present invention.

DETAILED DESCRIPTION

Figure 1:
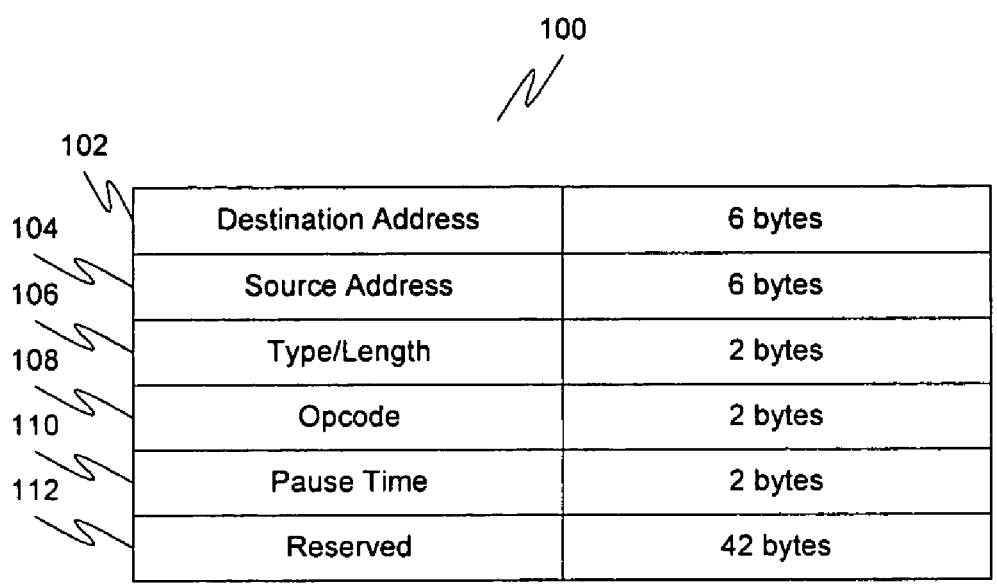
FIG. 1 is a diagram illustrating MAC control PAUSE frames according to IEEE 802.3x.
Figure 2:
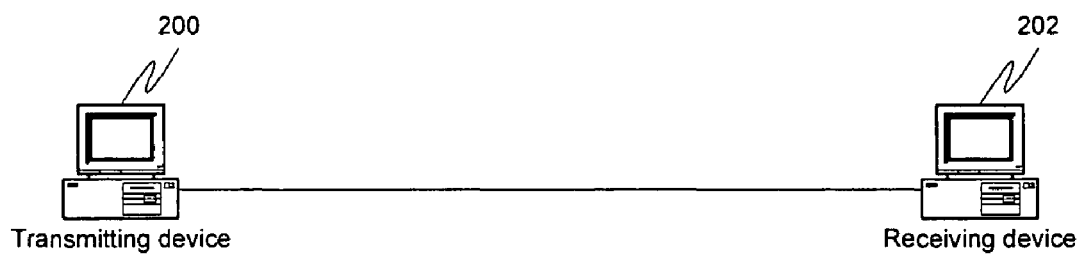
FIG. 2 is a diagram illustrating a typical system utilizing PAUSE frames.
Figure 3:
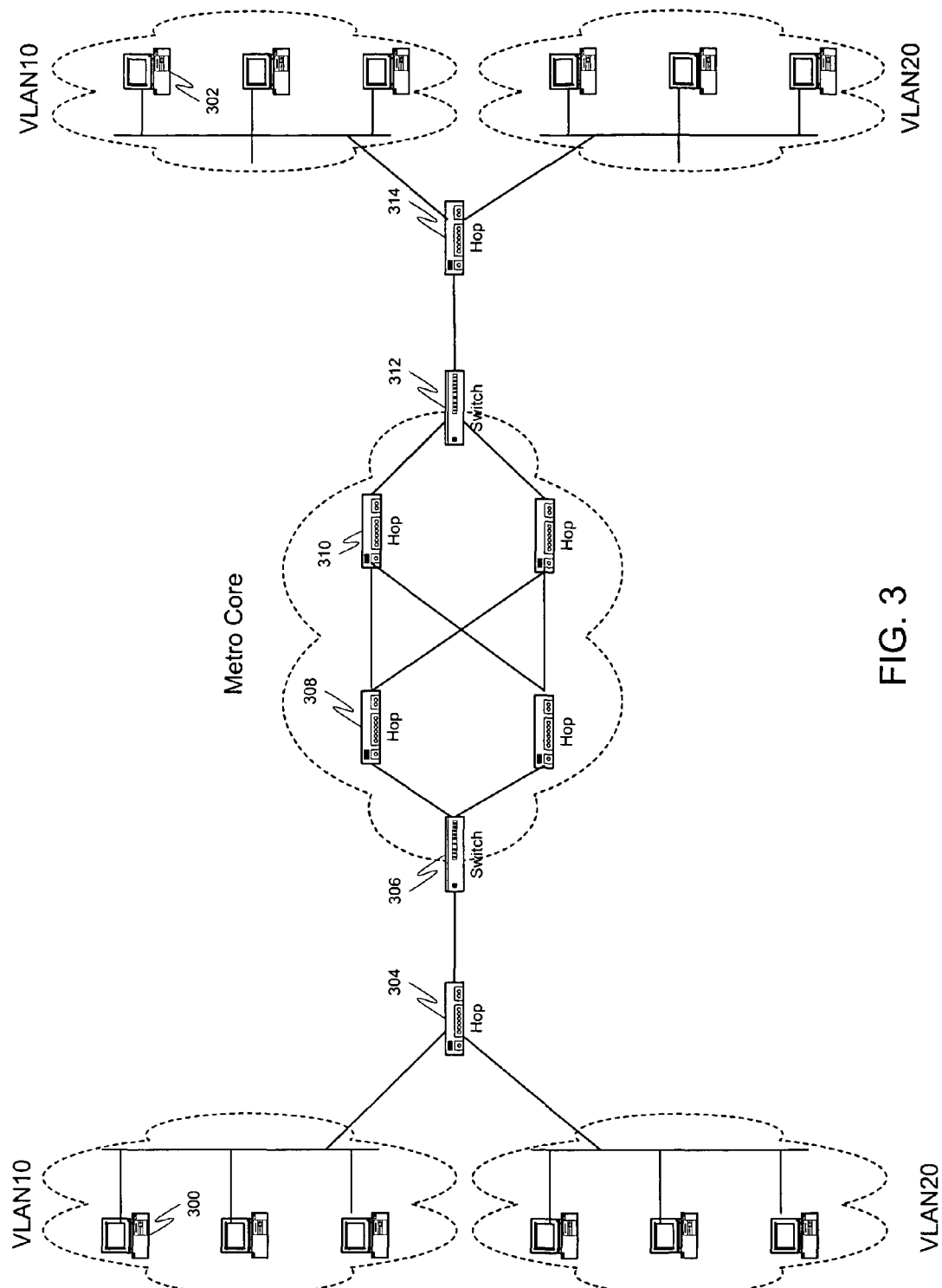
FIG. 3 is a diagram illustrating a typical metro Ethernet environment.

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Furthermore, the present invention is described in the context of a switch. However, one of ordinary skill in the art will recognize that the term switch should be read broadly, so as to include any device that directs packets, including a router and a gateway.

The present invention provides mechanisms to allow a network device to apply flow control on the MAC layer while taking into account the priority of the frames of traffic. Furthermore, the present invention provides mechanisms to extend such flow control (and flow control in general) to VLANs across a metropolitan area network (MAN) or wide area network (WAN).

Two mechanisms are described herein for applying flow control on a MAC layer for packets having a priority value. One of ordinary skill in the art will recognize that the specifics of these mechanisms are merely examples and should not be read as limiting. In one embodiment of the present invention, a different opcode value along with a new field may be utilized in the PAUSE frame in order to indicate how to handle frames of varying priorities. The new field may be termed a priority mask, and may be used to identify to which priority to apply the PAUSE command. Thus, FIG. 4 is a diagram illustrating a PAUSE frame format in accordance with an embodiment of the present invention. Destination address 400, source address 402 and type/length 404 may remain the same as the typical PAUSE frame. The opcode field 406 may contain a different value.

The new priority mask field 408 may be two bytes long, however the first byte may be unused in systems having 8 or fewer possible priority levels. In this embodiment, each bit of the second byte may correspond to a different priority level. Therefore, bit 0 might correspond to a priority level of 0, bit 1 to a priority level of 1, etc. The presence of any bit signals the traffic with the specific priority to be paused.

In an embodiment of the present invention, the pause time field 410 may be extended to 16 bytes, to allow for each priority level to have a different pause time. This may be utilized only when it is desired to have varying pause times—if it is more desirable in a specific instance to have a single pause time for all paused traffic, the only pause time field may be used. The new pause time field allows for 8 2-byte values for pause time. For example, as depicted in FIG. 5, if it is desired for all traffic with priorities of 0, 1, and 2 to be paused, with the pause time value of traffic with priority 0 being 7, traffic with priority 1 being 5, and traffic with priority 2 being 3, then the priority mask 500 may be set at 00000111, and the pause time array 502 set at zero for each of the first 5 2-byte entries, the sixth entry being set at 0×3, the seventh at 0×5, and the eighth at 0×7.

Typically, the PAUSE frame utilizes an opcode value of 1. In an embodiment of the present invention, an opcode value of 2 may indicate the presence of the priority mask field—thus the receiving device would pause traffic with a priority value indicated by the priority mask. The pausing in this instance would be for a set time for all priorities, thus using only a single value in the pause time field.

An opcode value of 3, then, may indicate the presence of both the priority mask field and the new pause time field, thus indicating to the receiving device that it should pause traffic with a priority value indicated by the priority mask, for time periods as specified in the new pause time field.

In another embodiment of the present invention, a new type/length value may be used. This embodiment is beneficial when encountering devices utilizing older MAC standards, which may not be able to understand the new opcode values described above. Typically, the value "8808" is utilized in the type/length field to indicate a PAUSE frame. In this embodiment, the value "8809" may be used, for example, to indicate that this is a PAUSE frame that handles priority. The opcode field may then be used to indicate whether or not all the traffic priority levels utilize the same pause time—rather than values of 2 and 3 they may be, for example, 1 and 2. Otherwise, the frame format described in FIG. 5 may be utilized in this embodiment as is. Thus, the presence of "8809" in the type/length field along with a value of 1 in the opcode field would indicate the presence of the priority mask field and that the receiving device should pause traffic with the corresponding priority value(s) for a set, single period of time set in the pause time field. The presence of "8809" in the type/length field along with a value of 2 in the opcode field would indicate the presence of the priority mask field and the new pause time field, thus indicating to the receiving device that it should pause traffic with a priority value indicated by the priority mask, for time periods as specified in the new pause time field.

Figure 6:
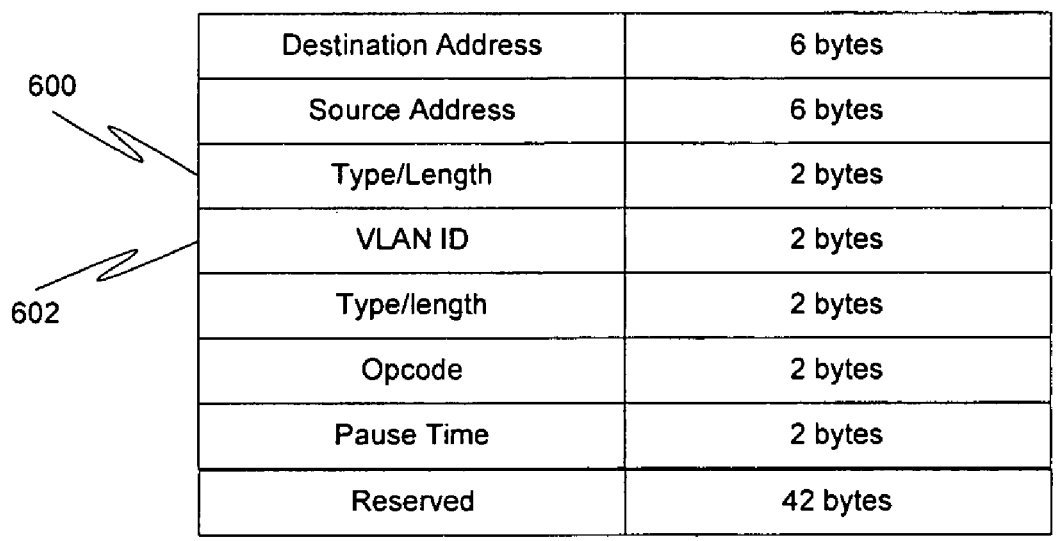
FIG. 6 is a diagram illustrating a VLAN tagged PAUSE frame protocol in accordance with an embodiment of the present invention.

In another embodiment of the present invention, the PAUSE frames may be tagged in order for them to exchange PAUSE information end-to-end over multiple hops across different networks. For simplicity, this may be referred to as VLAN tagging. The VLAN tag may be generated based on a stored configuration. FIG. 6 is a diagram illustrating a VLAN tagged PAUSE frame protocol in accordance with an embodiment of the present invention. This tag may involve appending a new type/length field 600 to the pause frame indicating it is tagged, as well as a VLAN identification 602 identifying the VLAN in which traffic needs to be paused. This embodiment works with typical PAUSE frames.

In yet another embodiment of the present invention, VLAN tagging may be combined with one of the new PAUSE frame mechanisms. FIG. 7 is a diagram illustrating a VLAN tagged priority-based PAUSE frame protocol in accordance with an embodiment of the present invention. As can be seen, the new type/length and VLAN ID fields described in FIG. 6 are combined with the priority-based PAUSE frame protocol described in FIG. 4.

One potential concern with VLAN tagging is that a hop may not be able to interpret the new type/length and VLAN ID fields. In order to prevent such occurrences, the destination address may be modified to a unique unused value. For example, rather than 01-80-c2-00-00-01, it may be set to 01-80-c2-00-00-03. This prevents problems that could occur with older switches.

Certain ports from certain switches may be configured to be tagged. Therefore, outgoing PAUSE frames on these ports may contain the VLAN tagging described above. Upon receipt of a VLAN tagged PAUSE packet, a switch or hub will simply forward it like an ordinary packet. The last hop, however, may be configured with an untagged port to the receiving device. It may strip the tag, and forward it to one or more of these ports in the VLAN. This allows the sources for the VLAN traffic to reduce their traffic.

Figure 8:
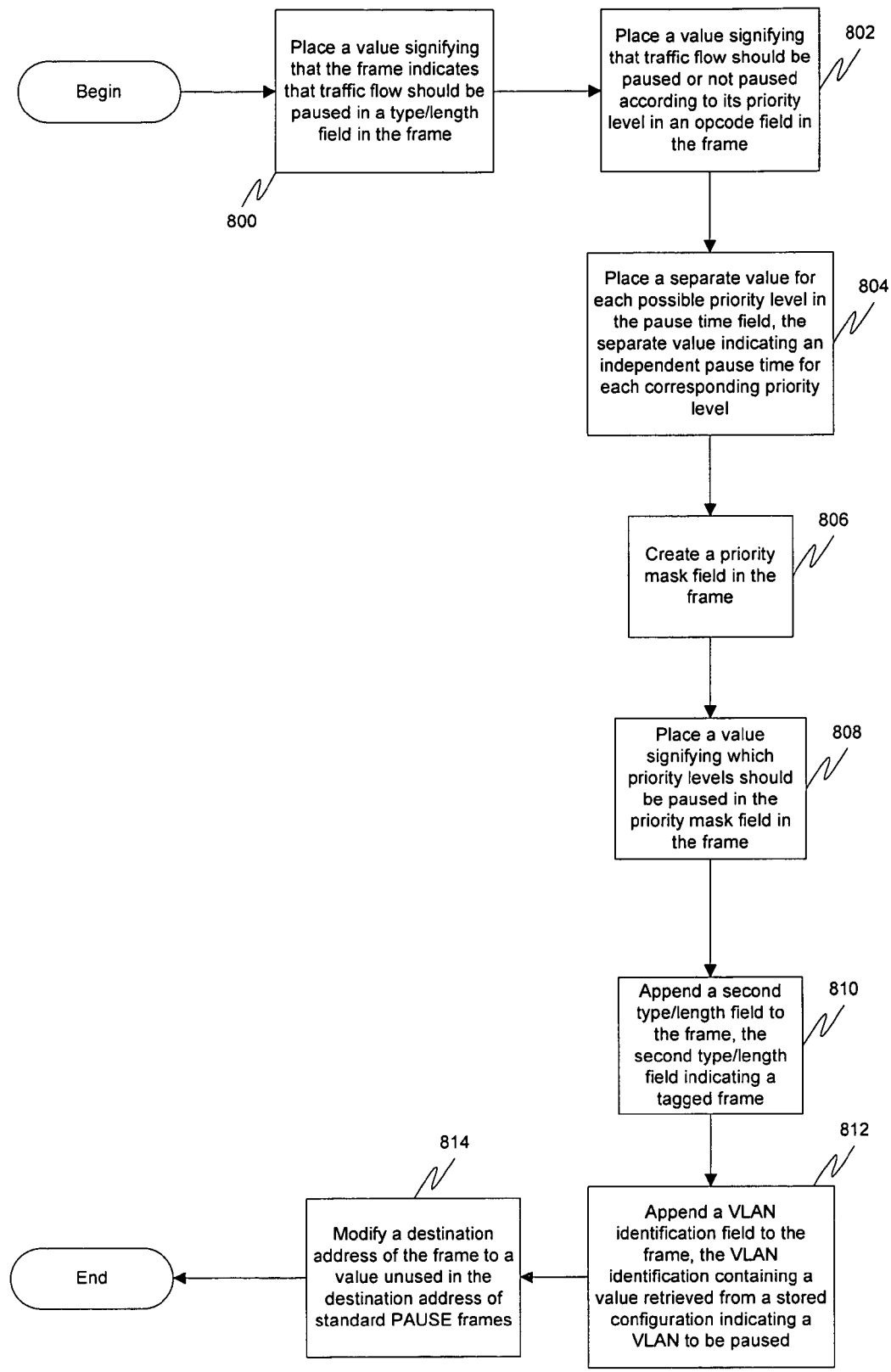
FIG. 8 is a flow diagram illustrating a method for generating a frame indicating that traffic flow should be paused to a network device, the traffic flow having varying priority levels, in accordance with an embodiment of the present invention.

FIG. 8 is a flow diagram illustrating a method for generating a frame indicating that traffic flow should be paused to a network device, the traffic flow having varying priority levels, in accordance with an embodiment of the present invention. At 800, a value signifying that the frame indicates that traffic flow should be paused may be placed in a type/length field in the frame. This may be a value identical to that of standard PAUSE frames, for example. At 802, a value signifying that traffic flow should be paused or not paused according to its priority level may be placed in an opcode field in the frame. This value may also indicate whether the pausing will be for time indicated by a pause time field in the frame without regard for the priority level (if the same pause time for each priority level is desired), or whether the pausing will be for times corresponding to each priority level indicated by the pause time field (if independent pause times for each priority level are desired). If the latter, then at 804, a separate value for each possible priority level may be placed in the pause time field, the separate value indicating an independent pause time for each corresponding priority level. The pause time field in that case may be equal in size to the pause time field in a standard PAUSE frame multiplied by the number of possible priority levels. These opcode values may be values not used by standard PAUSE frames in the opcode field. At 806, a priority mask field may be created in the frame. At 808, a value signifying which priority levels should be paused may be placed in the priority mask field in the frame.

At 810, a second type/length field may be appended to the frame, the second type/length field having a value indicating a tagged frame. At 812, a VLAN identification field may be appended to the frame, the VLAN identification containing a value retrieved from a stored configuration indicating a VLAN in which traffic needs to be paused 810 and 812 may be performed only in the case where VLAN tagging is warranted. Additionally, at 814, a destination address of the frame may be modified to a value unused in the destination address of standard PAUSE frames. This is useful in cases where VLAN tagging is warranted and there is some concern over the compatibility of older switches.

Figure 9:
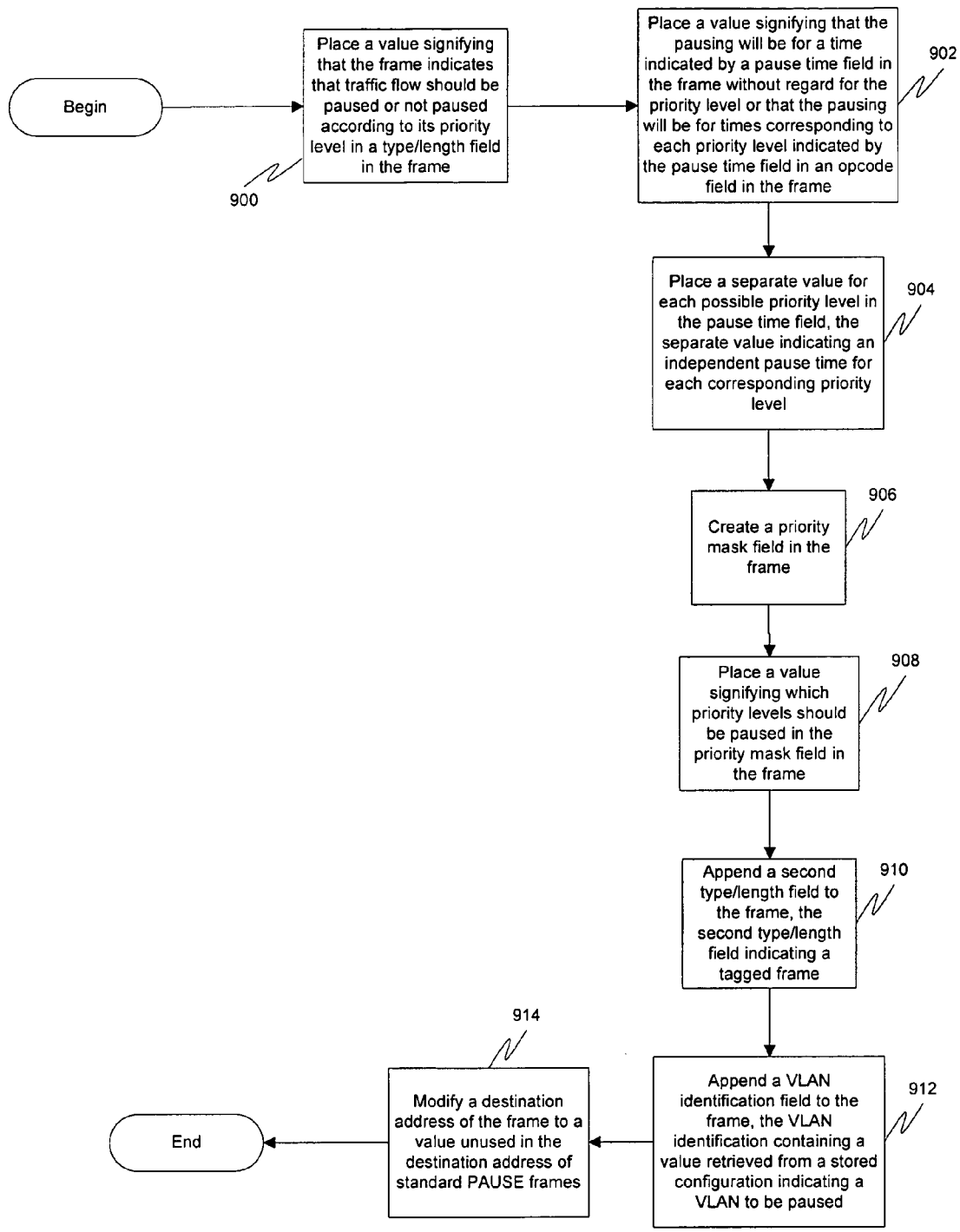
FIG. 9 is a flow diagram illustrating a method for generating a frame indicating that traffic flow should be paused to a network device, the traffic flow having varying priority levels, in accordance with another embodiment of the present invention.

FIG. 9 is a flow diagram illustrating a method for generating a frame indicating that traffic flow should be paused to a network device, the traffic flow having varying priority levels, in accordance with another, embodiment of the present invention. At 900, a value signifying that the frame indicates that traffic flow should be paused or not paused according to its priority level may be placed in a type/length field in the frame. This may be a value unused in standard PAUSE frames, for example. At 902, a value signifying that the pausing will be for a time indicated by a pause time field in the frame without regard for the priority level (if the same pause time for each priority level is desired), or that the pausing will be for times corresponding to each priority level indicated by the pause time field (if independent pause times for each priority level are desired) may be placed in an opcode field in the frame. If the latter, then at 904, a separate value for each possible priority level may be placed in the pause time field, the separate value indicating an independent pause time for each corresponding priority level. The pause time field in that case may be equal in size to the pause time field in a standard PAUSE frame multiplied by the number of possible priority levels. At 906, a priority mask field may be created in the frame. At 908, a value signifying which priority levels should be paused may be placed in the priority mask field in the frame.

At 910, a second type/length field may be appended to the frame, the second type/length field having a value indicating a tagged frame. At 912, a VLAN identification field may be appended to the frame, the VLAN identification containing a value retrieved from a stored configuration indicating a VLAN in which traffic needs to be paused 910 and 912 may be performed only in the case where VLAN tagging is warranted. Additionally, at 914, a destination address of the frame may be modified to a value unused in the destination address of standard PAUSE frames. This is useful in cases where VLAN tagging is warranted and there is some concern over the compatibility of older switches.

Figure 10:
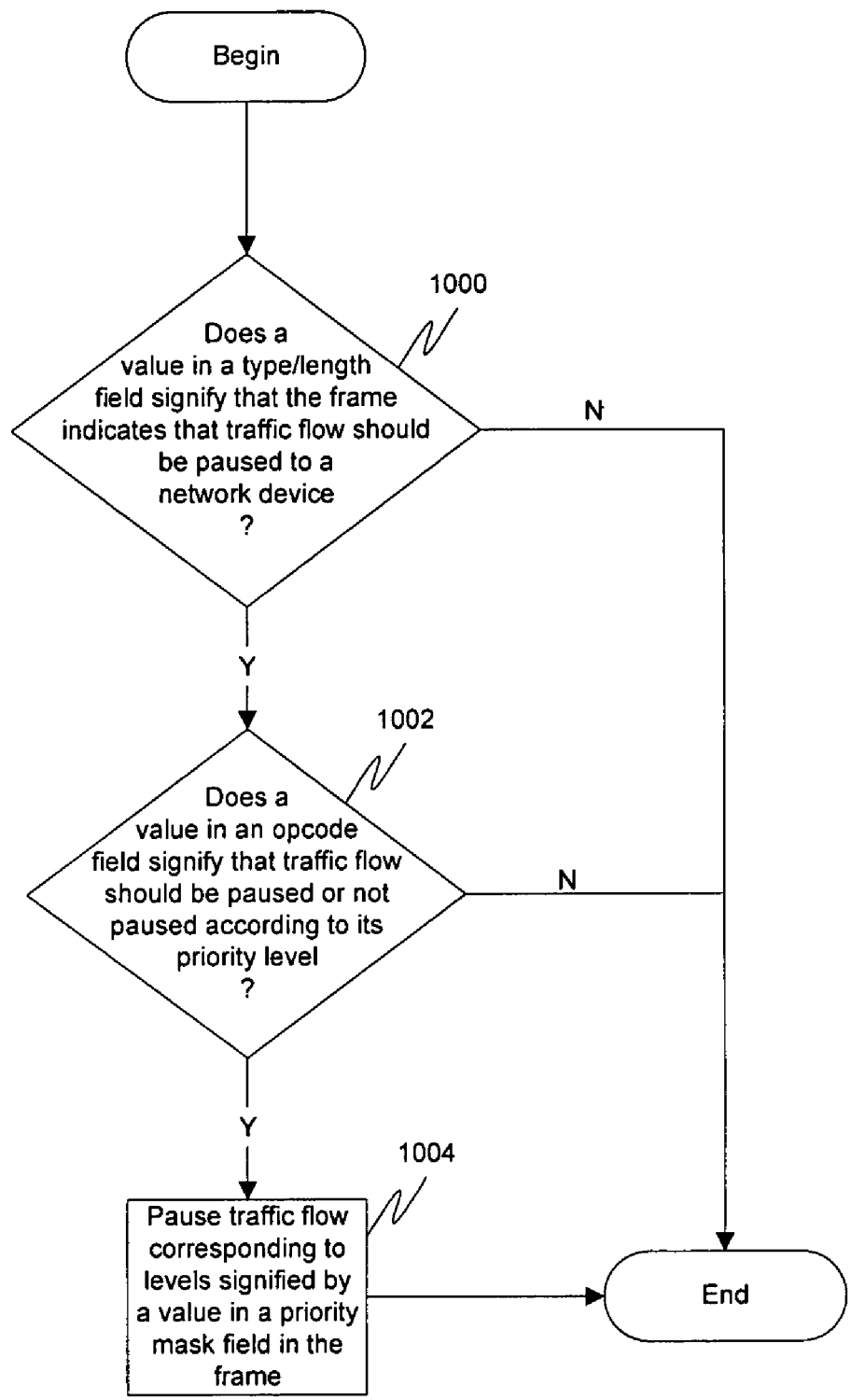
FIG. 10 is a flow diagram illustrating a method for handling a frame in a network with traffic flow having varying priority levels, in accordance with an embodiment of the present invention.

FIG. 10 is a flow diagram illustrating a method for handling a frame in a network with traffic flow having varying priority levels, in accordance with an embodiment of the present invention. At 1000, a value in a type/length field in the frame may be examined to determine if it signifies that the frame indicates that traffic flow should be paused to a network device. If it does, then at 1002, a value in an opcode field in the frame may be examined to determine if it signifies that traffic flow should be paused or not paused according to its priority level. If this is also true, then at 1004, traffic flow with priority levels corresponding to levels signified by a value in a priority mask field in the frame may be paused. At 1002, the examining of the opcode field may include examining it to determine if it also signifies that the pausing will be for a time indicated by a pause time field in the frame without regard to priority level or whether the pausing will be for times corresponding to each priority level indicated by the pause time field. If the former, then at 1004, the pausing may include pausing the traffic flow for a time period indicated by the pause time field in the frame without regard to priority level. If the latter, then at 1004, the pausing may include pausing the traffic flow for time periods indicated by times corresponding to each priority level in the pause time field. These times may be a separate value for each possible priority level indicating an independent pause time for each corresponding priority level.

Figure 11:
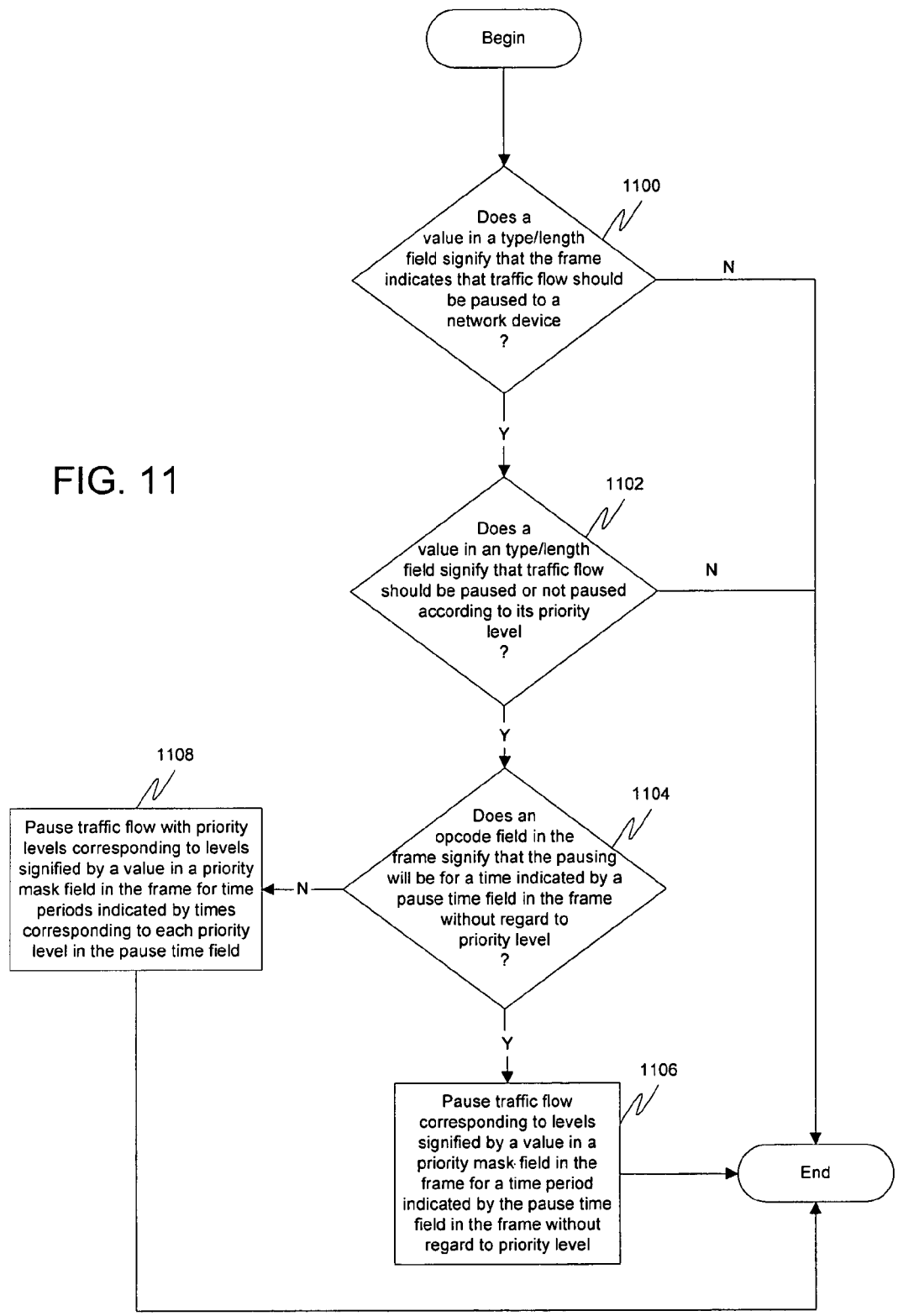
FIG. 11 is a flow diagram illustrating a method for handling a frame in a network with traffic flow having varying priority levels, in accordance with another embodiment of the present invention.

FIG. 11 is a flow diagram illustrating a method for handling a frame in a network with traffic flow having varying priority levels, in accordance with another embodiment of the present invention. At 1100, a value in a type/length field in the frame may be examined to determine if it signifies that the frame indicates that traffic flow should be paused to a network device and, at 1102, if it signifies that traffic flow should be paused or not paused according to its priority level. If both are true, then at 1104, a value in an opcode field in the frame may be examined to determine if it signifies that the pausing will be for a time indicated by a pause time field in the frame without regard to priority level or whether the pausing will be for times corresponding to each priority level indicated by the pause time field. If the former, then at 1106, the traffic flow with priority levels corresponding to levels signified by a value in a priority mask field in the frame may be paused for a time period indicated by the pause time field in the frame without regard to priority level. If the latter, then at 1108, the traffic flow with priority levels corresponding to levels signified by a value in a priority mask field in the frame may be paused for time periods indicated by times corresponding to each priority level in the pause time field. These times may be a separate value for each possible priority level indicating an independent pause time for each corresponding priority level.

Figure 12:
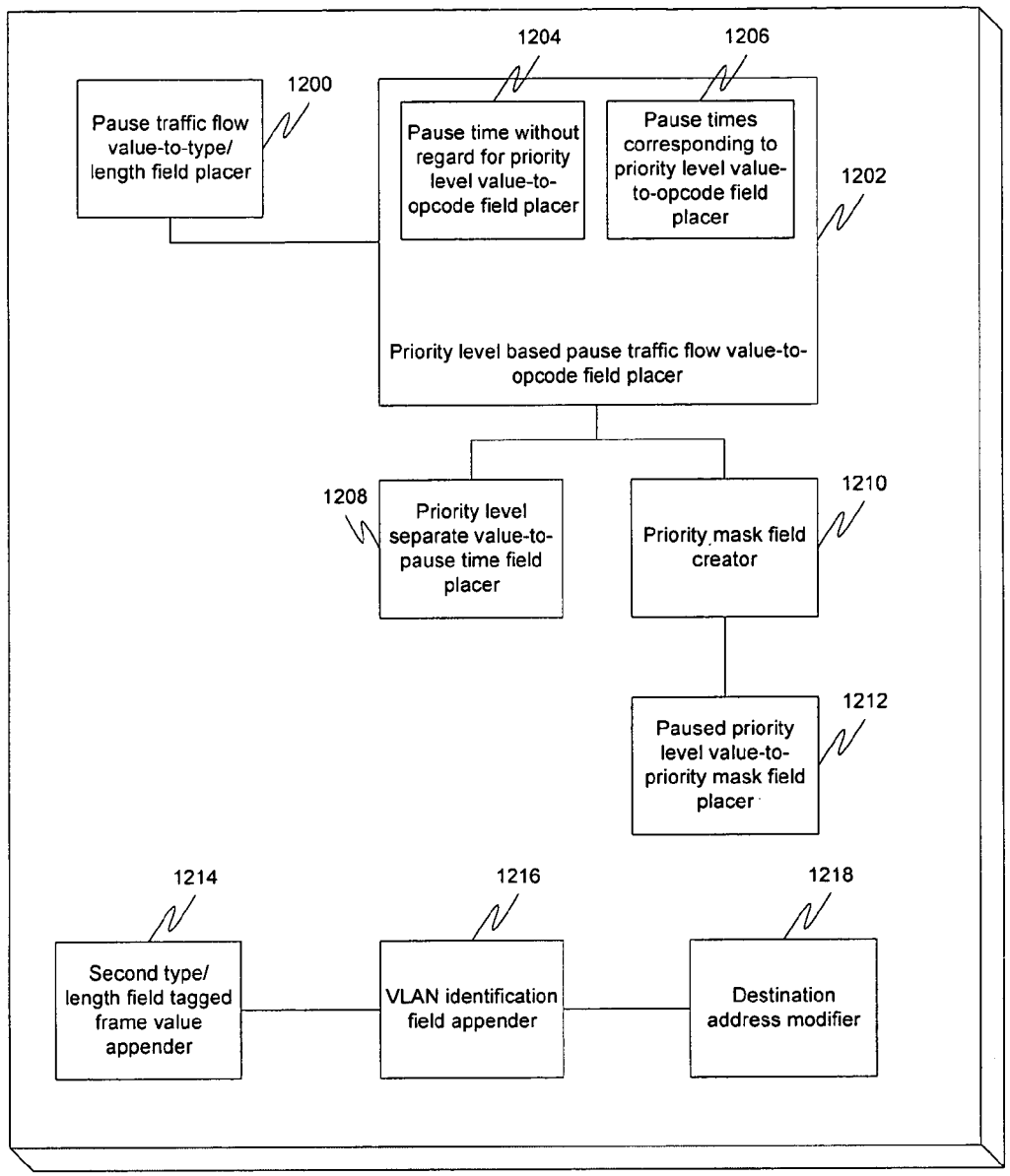
FIG. 12 is a block diagram illustrating an apparatus for generating a frame indicating that traffic flow should be paused to a network device, the traffic flow having varying priority levels, in accordance with an embodiment of the present invention.

FIG. 12 is a block diagram illustrating an apparatus for generating a frame indicating that traffic flow should be paused to a network device, the traffic flow having varying priority levels, in accordance with an embodiment of the present invention. A pause traffic flow value-to-type/length field placer 1200 may place a value signifying that the frame indicates that traffic flow should be paused in a type/length field in the frame. This may be a value identical to that of standard PAUSE frames, for example. A priority level based pause traffic flow value-to-opcode field placer 1202 coupled to the pause traffic flow value-to-type/length field placer 1200 may place a value signifying that traffic flow should be paused or not paused according to its priority level in an opcode field in the frame. This value may also indicate whether the pausing will be for time indicated by a pause time field in the frame without regard for the priority level (if the same pause time for each priority level is desired), by using a pause time without regard for priority level value-to-opcode field placer 1204, or whether the pausing will be for times corresponding to each priority level indicated by the pause time field (if independent pause times for each priority level are desired), by using a pause times corresponding to priority level value-to-opcode field placer 1206. If the latter, then a priority level separate value-to-pause time field placer 1208 coupled to the priority level based pause traffic flow value-to-opcode field placer 1202 may place a separate value for each possible priority level in the pause time field, the separate value indicating an independent pause time for each corresponding priority level. The pause time field in that case may be equal in size to the pause time field in a standard PAUSE frame multiplied by the number of possible priority levels. These opcode values may be values not used by standard PAUSE frames in the opcode field. A priority mask field creator 1210 coupled to the priority level based pause traffic flow value-to-opcode field placer 1202 may create a priority mask field in the frame. A paused priority level value-to-priority mask field placer 1212 coupled to the priority mask field creator 1210 may place a value signifying which priority levels should be paused in the priority mask field in the frame.

A second type/length field tagged frame value appender 1214 may append a second type/length field to the frame, the second type/length field having a value indicating a tagged frame. A VLAN identification field appender 1216 coupled to the second type/length field tagged frame value appender 1214 may append a VLAN identification field to the frame, the VLAN identification containing a value retrieved from a stored configuration indicating a VLAN in which traffic needs to be paused. These may be used only in the case where VLAN tagging is warranted. Additionally, at destination address modifier 1218 coupled to the VLAN identification field appender 1216 may modify a destination address of the frame to a value unused in the destination address of standard PAUSE frames. This is useful in cases where VLAN tagging is warranted and there is some concern over the compatibility of older switches.

Figure 13:
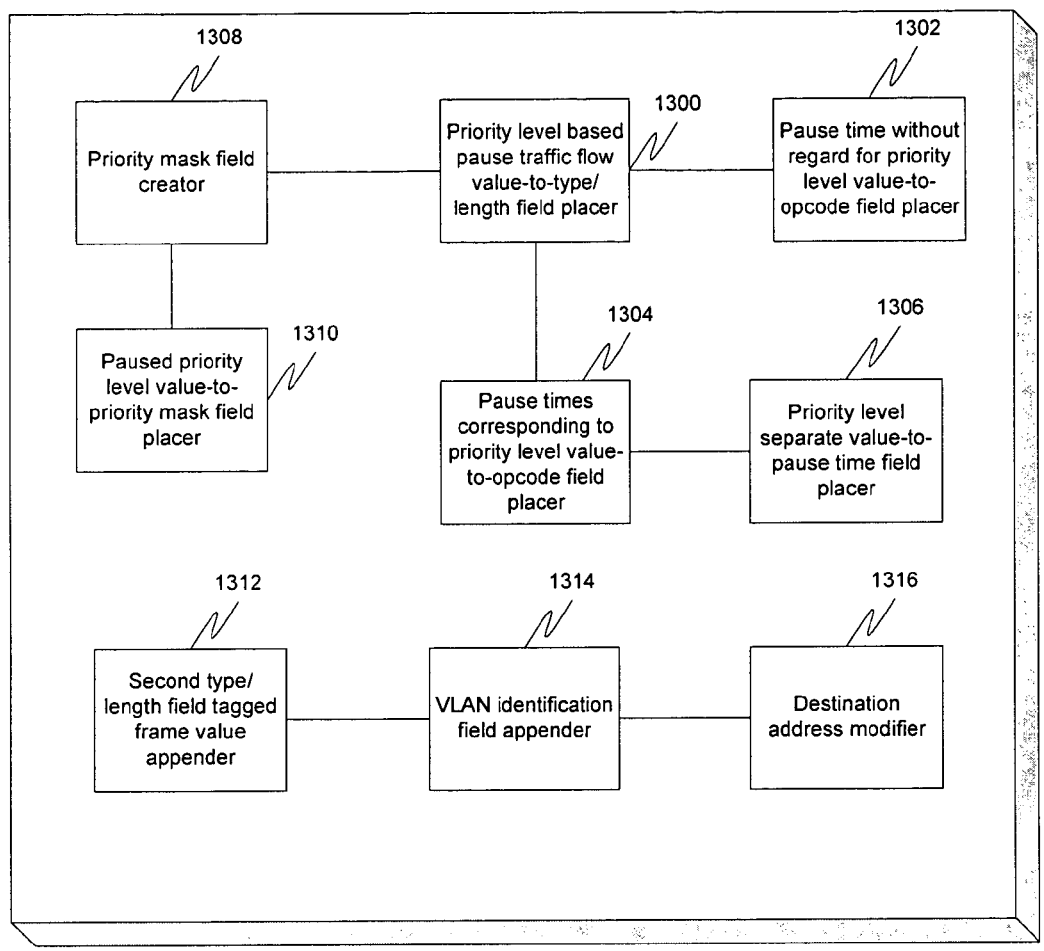
FIG. 13 is a block diagram illustrating an apparatus for generating a frame indicating that traffic flow should be paused to a network device, the traffic flow having varying priority levels, in accordance with another embodiment of the present invention.

FIG. 13 is a block diagram illustrating an apparatus for generating a frame indicating that traffic flow should be paused to a network device, the traffic flow having varying priority levels, in accordance with another embodiment of the present invention. A priority level based pause traffic flow value-to-type/length field placer 1300 may place a value signifying that the frame indicates that traffic flow should be paused or not paused according to its priority level in a type/length field in the frame. This may be a value unused in standard PAUSE frames, for example. A pause time without regard for priority level value-to-opcode field placer 1302 coupled to the priority level based pause traffic flow value-to-type/length field placer 1300 may place a value in the opcode field signifying that the pausing will be for a time indicated by a pause time field in the frame without regard for the priority level if the same pause time for each priority level is desired. Alternatively, a pause times corresponding to priority level value-to-opcode field placer 1304 coupled to the priority level based pause traffic flow value-to-type/length field placer 1300 may place a value in the opcode field signifying that the pausing will be for times corresponding to each priority level indicated by the pause time field if independent pause times for each priority level are desired. If the latter, then a priority level separate value-to-pause time field placer 1306 coupled to the pause times corresponding to priority level value-to-opcode field placer 1304 may place a separate value for each possible priority level in the pause time field, the separate value indicating an independent pause time for each corresponding priority level. The pause time field in that case may be equal in size to the pause time field in a standard PAUSE frame multiplied by the number of possible priority levels. A priority mask field creator 1308 coupled to the priority level based pause traffic flow value-to-type/length field placer 1300 may create a priority mask field in the frame. A paused priority level value-to-priority mask field placer 1310 coupled to the priority mask field creator 1308 may place a value signifying which priority levels should be paused in the priority mask field in the frame.

A second type/length field tagged frame value appender 1312 may append a second type/length field to the frame, the second type/length field having a value indicating a tagged frame. A VLAN identification field appender 1314 coupled to the second type/length field tagged frame value appender 1312 may append a VLAN identification field to the frame, the VLAN identification containing a value retrieved from a stored configuration indicating a VLAN in which traffic needs to be paused. These may be used only in the case where VLAN tagging is warranted. Additionally, at destination address modifier 1316 coupled to the VLAN identification field appender 1314 may modify a destination address of the frame to a value unused in the destination address of standard PAUSE frames. This is useful in cases where VLAN tagging is warranted and there is some concern over the compatibility of older switches.

Figure 14:
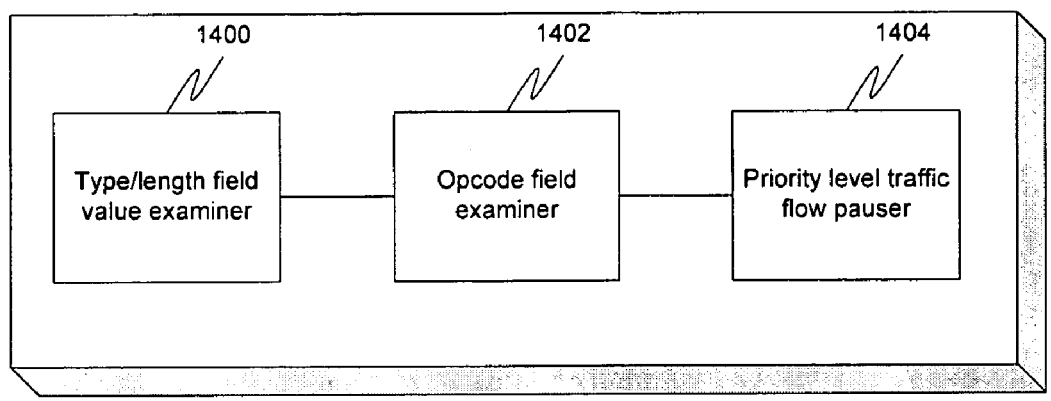
FIG. 14 is a block diagram illustrating an apparatus for handling a frame in a network with traffic flow having varying priority levels, in accordance with an embodiment of the present invention.

FIG. 14 is a block diagram illustrating an apparatus for handling a frame in a network with traffic flow having varying priority levels, in accordance with an embodiment of the present invention. A type/length field value examiner 1400 may examine a value in a type/length field in the frame to determine if it signifies that the frame indicates that traffic flow should be paused to a network device. If it does, then an opcode field value examiner 1402 coupled to the type/length field value examiner 1400 may examine a value in an opcode field in the frame to determine if it signifies that traffic flow should be paused or not paused according to its priority level. If this is also true, then a priority level traffic flow pauser 1404 coupled to the opcode field value examiner 1402 may pause traffic flow with priority levels corresponding to levels signified by a value in a priority mask field in the frame. The examining of the opcode field may include examining it to determine if it also signifies that the pausing will be for a time indicated by a pause time field in the frame without regard to priority level or whether the pausing will be for times corresponding to each priority level indicated by the pause time field. If the former, then the pausing may include pausing the traffic flow for a time period indicated by the pause time field in the frame without regard to priority level. If the latter, then the pausing may include pausing the traffic flow for time periods indicated by times corresponding to each priority level in the pause time field. These times may be a separate value for each possible priority level indicating an independent pause time for each corresponding priority level.

Figure 15:
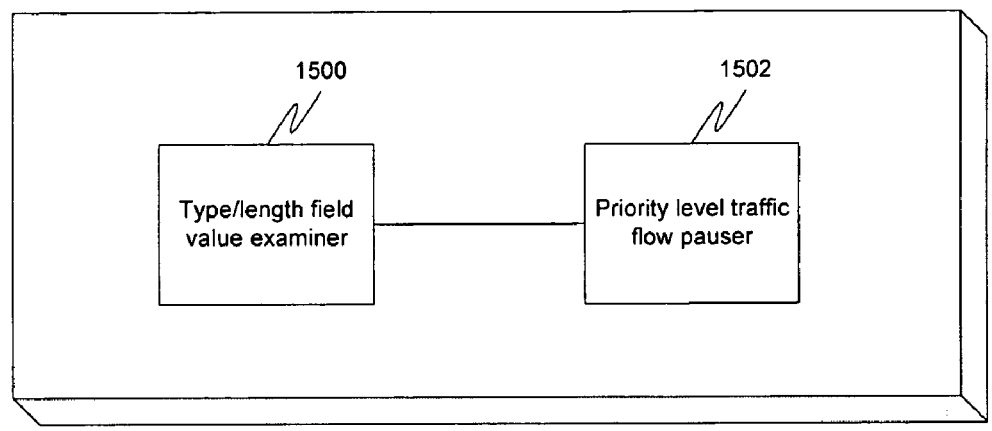
FIG. 15 is a block diagram illustrating an apparatus for handling a frame in a network with traffic flow having varying priority levels, in accordance with another embodiment of the present invention.

FIG. 15 is a block diagram illustrating an apparatus for handling a frame in a network with traffic flow having varying priority levels, in accordance with another embodiment of the present invention. A type/length field value examiner 1500 may examine a value in a type/length field in the frame to determine if it signifies that the frame indicates that traffic flow should be paused to a network device and if it signifies that traffic flow should be paused or not paused according to its priority level. If both are true, then a priority level traffic flow pauser 1502 coupled to the type/length field value examiner 1500 may pause the traffic flow with priority levels corresponding to levels signified by a value in a priority mask field in the frame.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A computer implemented method comprising:
   at a network device, monitoring traffic into a first port of the network device based on a virtual local area network (VLAN) identification field in packets of the traffic; and
   if the monitoring indicates the network device cannot handle traffic flow from a first VLAN,
      creating a frame indicating that traffic flow from the first VLAN should be paused; and
      appending a first field to the frame, the first field:
         having a value indicating a tagged frame; and
         having a value indicating the first VLAN.

2. The method of claim 1, further comprising indicating the frame should be sent to all ports of the first VLAN other than the first port.

3. The method of claim 1, further comprising tracking one or more resources used to forward traffic for the first VLAN.

4. The method of claim 1 wherein the monitoring further comprises detecting insufficient resources caused by the traffic.

5. The method of claim 4, further comprising:
   responsive to the detecting, indicating the frame should be sent.

6. The method of claim 5, wherein the indicating comprises indicating the frame should be sent by tunneling the frame.

7. The method of claim 1 wherein the value indicating the first VLAN is retrieved from a stored configuration.

8. The method of claim 1 wherein the first field comprises:
   a first sub-field comprising the value indicating a tagged frame; and
   a second sub-field comprising the value indicating the first VLAN.

9. An apparatus comprising:
   a memory;
   logic to monitor traffic into a first port of the apparatus based on a virtual local area network (VLAN) identification field in packets of the traffic;
   a pause traffic frame creator configured to, if the monitoring indicates the apparatus cannot handle traffic flow from a first VLAN, create a frame indicating that traffic flow from the first VLAN should be paused; and
   a field appender coupled to the pause traffic frame creator and configured to append a first field to the frame, the first field:
      having a value indicating a tagged frame; and
      having a value indicating the first VLAN.

10. The apparatus of claim 9, the apparatus further configured to indicate the frame should be sent to all ports of the first VLAN other than the first port.

11. The apparatus of claim 9, wherein the apparatus is further configured to track one or more resources used to forward traffic for the first VLAN.

12. The apparatus of claim 9 wherein the apparatus is further configured to detect insufficient resources caused by the traffic.

13. The apparatus of claim 12 wherein the apparatus is further configured to, responsive to the detecting, indicate the frame should be sent.

14. The apparatus of claim 13 wherein the apparatus is further configured to, responsive to the detecting, indicate the frame should be sent by tunneling the frame.

15. The apparatus of claim 9 wherein the value indicating the first VLAN is retrieved from a stored configuration.

16. The apparatus of claim 9 wherein the first field comprises:
   a first sub-field comprising the value indicating a tagged frame; and
   a second sub-field comprising the value indicating the first VLAN.

17. An apparatus comprising:
   a memory;
   means for, at a network device, monitoring traffic into a first port of the network device based on a virtual local area network (VLAN) identification field in packets of the traffic; and
   means for, if the monitoring indicates the network device cannot handle traffic flow from a first VLAN,
      creating a frame indicating that traffic flow from the first VLAN should be paused; and
      appending a first field to the frame, the first field:
         having a value indicating a tagged frame; and
         having a value indicating the first VLAN.

18. The apparatus of claim 17, further comprising means for indicating the frame should be sent to all ports of the first VLAN other than the first port.

19. The apparatus of claim 17 wherein the value indicating the first VLAN is retrieved from a stored configuration.

20. The apparatus of claim 17 wherein the first field comprises:
   a first sub-field comprising the value indicating a tagged frame; and
   a second sub-field comprising the value indicating the first VLAN.

21. A program storage device readable by a computer, embodying a program of instructions executable by the computer to perform a method, the method comprising:
   at a network device, monitoring traffic into a first port of the network device based on a virtual local area network (VLAN) identification field in packets of the traffic; and
   if the monitoring indicates the network device cannot handle traffic flow from a first VLAN,
      creating a frame indicating that traffic flow from the first VLAN should be paused; and
      appending a first field to the frame, the first field:
         having a value indicating a tagged frame; and
         having a value indicating the first VLAN.

22. The program storage device of claim 21 wherein the value indicating the first VLAN is retrieved from a stored configuration.

23. The program storage device of claim 21 wherein the first field comprises:
   a first sub-field comprising the value indicating a tagged frame; and
   a second sub-field comprising the value indicating the first VLAN.

24. One or more application specific integrated circuits (ASICs) configured to perform the method recited in claim 1.

25. A computer implemented method comprising:
   at a network device, monitoring traffic into a first port of the network device based on a virtual local area network (VLAN) identification field in packets of the traffic;
   in response to the monitoring, creating a frame indicating that traffic flow from a first VLAN should be paused; and
   appending a first field to the frame, the first field comprising:
      a first sub-field comprising a value indicating a tagged frame; and
      a second sub-field comprising a value indicating the first VLAN.

26. An apparatus comprising:
   a memory;
   logic to monitor traffic into a first port based on a virtual local area network (VLAN) identification field in packets of the traffic;
   a pause traffic frame creator configured to, in response to the monitoring, create a frame indicating that traffic flow from a first VLAN should be paused; and
   a field appender coupled to the pause traffic frame creator and configured to append a first field to the frame, the first field comprising:
      a first sub-field comprising a value indicating a tagged frame; and
      a second sub-field comprising a value indicating the first VLAN.

27. An apparatus comprising:
   a memory;
   means for monitoring traffic into a first port based on a virtual local area network (VLAN) identification field in packets of the traffic;
   means for, in response to the monitoring, creating a frame indicating that traffic flow from a first VLAN should be paused; and
   means for appending a first field to the frame, the first field comprising:
      a first sub-field comprising a value indicating a tagged frame; and
      a second sub-field comprising a value indicating the first VLAN.

28. A program storage device readable by a computer, embodying a program of instructions executable by the computer to perform a method, the method comprising:
   monitoring traffic into a first port based on a virtual local area network (VLAN) identification field in packets of the traffic;
   in response to the monitoring, creating a frame indicating that traffic flow from a first VLAN should be paused; and
   appending a first field to the frame, the first field comprising:
      a first sub-field comprising a value indicating a tagged frame; and
      a second sub-field comprising a value indicating the first VLAN.

* * * * *